United States Patent
Wei et al.

(10) Patent No.: US 11,892,749 B2
(45) Date of Patent: Feb. 6, 2024

(54) IMAGING MODULE AND ELECTRONIC APPARATUS

(71) Applicant: GUANGDONG OPPO MOBILE TELECOMMUNICATIONS CORP., LTD., Guangdong (CN)

(72) Inventors: Yi Wei, Guangdong (CN); Jiawei Chen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 379 days.

(21) Appl. No.: 17/323,718

(22) Filed: May 18, 2021

(65) Prior Publication Data
US 2021/0271152 A1 Sep. 2, 2021

Related U.S. Application Data

(63) Continuation of application No. PCT/CN2019/103996, filed on Sep. 2, 2019.

(30) Foreign Application Priority Data

Nov. 26, 2018 (CN) .......................... 201811416035.8

(51) Int. Cl.
*H04N 5/33* (2023.01)
*G03B 13/34* (2021.01)

(52) U.S. Cl.
CPC ............... *G03B 13/34* (2013.01); *H04N 5/33* (2013.01)

(58) Field of Classification Search
None
See application file for complete search history.

(56) References Cited

U.S. PATENT DOCUMENTS

| | | | |
|---|---|---|---|
| 2012/0275030 A1* | 11/2012 | Kong | G02B 3/14 359/665 |
| 2015/0310243 A1 | 10/2015 | Ackley et al. | |
| 2016/0006963 A1* | 1/2016 | Jao | G03B 13/32 348/311 |

(Continued)

FOREIGN PATENT DOCUMENTS

| | | |
|---|---|---|
| CN | 101517452 A | 8/2009 |
| CN | 101600976 B | 11/2011 |

(Continued)

OTHER PUBLICATIONS

CN Office Action with English translation of CN application 201811416035.8 dated Jan. 16, 2020.

(Continued)

*Primary Examiner* — Eileen M Adams
(74) *Attorney, Agent, or Firm* — Young Basile Hanlon & MacFarlane, P.C.

(57) ABSTRACT

An imaging module, including a substrate, a sensor assembly, a lens assembly and an adjustable lens assembly. The sensor assembly is arranged on the substrate and is configured to receive light passing through the adjustable lens assembly and the lens assembly. The adjustable lens assembly includes a piezoelectric actuator and an adjustable lens, and the piezoelectric actuator is configured to deform the adjustable lens through the action of an electrical signal and change a focal length of the imaging module.

16 Claims, 7 Drawing Sheets

(56) References Cited

U.S. PATENT DOCUMENTS

2018/0143506 A1    5/2018  Campbell

FOREIGN PATENT DOCUMENTS

| | | |
|---|---|---|
| CN | 103389609 A | 11/2013 |
| CN | 204065445 U | 12/2014 |
| CN | 106657749 A | 5/2017 |
| CN | 108064350 A | 5/2018 |
| CN | 207560174 U | 6/2018 |
| CN | 108322632 A | 7/2018 |
| CN | 207926731 U | 9/2018 |
| CN | 207926732 U | 9/2018 |
| CN | 207926733 U | 9/2018 |
| CN | 109167909 A | 1/2019 |
| CN | 109270683 A | 1/2019 |
| CN | 109327580 A | 2/2019 |

OTHER PUBLICATIONS

CN Notice of Allowance with English translation of CN application 201811416035.8 dated Jun. 15, 2020.

International Search Report with English Translation of PCT/CN2019/103996 dated Oct. 28, 2019.

Extended European Search Report for EP Application 19888540.2 dated Nov. 16, 2021. (34 pages).

\* cited by examiner

IMAGING MODULE AND ELECTRONIC APPARATUS

CROSS-REFERENCE TO RELATED APPLICATION(S)

The present application is a continuation of the International Patent Application No. PCT/CN2019/103996, filed on Sep. 2, 2019, which claims priority to Chinese Application No. 201811416035.8, filed on Nov. 26, 2018. The entire contents of the before-mentioned patent applications are incorporated by reference as part of the disclosure of the present application.

TECHNICAL FIELD

The present disclosure relates to a field of image devices, in particular to an imaging module and an electronic apparatus.

BACKGROUND

At present, a voice coil motor is used by a lens module of a mobile phone to drive a lens to move for a scene focusing.

SUMMARY

Embodiments of the present disclosure provide an imaging module and an electronic apparatus.

The imaging module according to the embodiments of a first aspect of the present disclosure includes a substrate, a sensor assembly, a lens assembly and an adjustable lens assembly. The sensor assembly is arranged on the substrate and is configured to receive light passing through the adjustable lens assembly and the lens assembly. The adjustable lens assembly includes a piezoelectric actuator and an adjustable lens, and the piezoelectric actuator is configured to deform the adjustable lens through the action of an electrical signal and change a focal length of the imaging module.

The electronic apparatus according to the embodiments of a second aspect of the present disclosure includes a shell and an imaging module. The imaging module is arranged to the shell. The imaging module includes a substrate, a sensor assembly, a lens assembly and an adjustable lens assembly. The sensor assembly is arranged on the substrate and is configured to receive light passing through the adjustable lens assembly and the lens assembly. The adjustable lens assembly includes a piezoelectric actuator and an adjustable lens, and the piezoelectric actuator is configured to deform the adjustable lens through the action of an electrical signal and change a focal length of the imaging module.

The imaging module according to the embodiments of a third aspect of the present disclosure includes: a substrate; a sensor assembly arranged on the substrate; an adjustable lens assembly configured to be passed through by light; and a lens assembly arranged between the sensor assembly and the adjustable lens assembly, and configured to be passed through by the light passing through the adjustable lens assembly, the sensor assembly being configured to receive the light passing through the lens assembly. The adjustable lens assembly includes a piezoelectric actuator and an adjustable lens, and the piezoelectric actuator is configured to deform the adjustable lens and change a focal length of the imaging module.

Additional aspects and advantages of the embodiment of the present disclosure will be given in part in the following descriptions, and will become apparent in part from the following descriptions, or may be learned by practice of the embodiments of the present disclosure.

BRIEF DESCRIPTION OF DRAWINGS

The foregoing and/or additional aspects and advantages of the present disclosure will become apparent and easy to understand from the descriptions of the embodiments hereinafter with reference to the accompanying drawings.

DETAILED DESCRIPTION

Embodiments of the present disclosure are further described below in combination with the accompanying drawings. The same or similar reference numerals will be used throughout the drawings to refer to the same or similar elements or elements having the same or similar functions.

In addition, the embodiments of the present disclosure described below in combination with the accompanying drawings are exemplary, only used to explain the embodiments of the present disclosure and not to be construed as limiting the present disclosure.

In the present disclosure, unless expressly stated and defined otherwise, that a first feature is "on" or "under" a second feature may refer to that the first and second features are in direct contact, or that the first and second features are in indirect contact via an intermediary. Furthermore, that a first feature is "on", "above" and "over" a second feature may refer to that the first feature is directly over or obliquely over the second feature, or merely indicate that the horizontal height of the first feature is higher than that of the second feature. That a first feature is "under", "below" and "beneath" a second feature may refer to that the first feature is directly below or obliquely below the second feature, or merely indicate that the horizontal height of the first feature is lower than that of the second feature.

Figure 4:
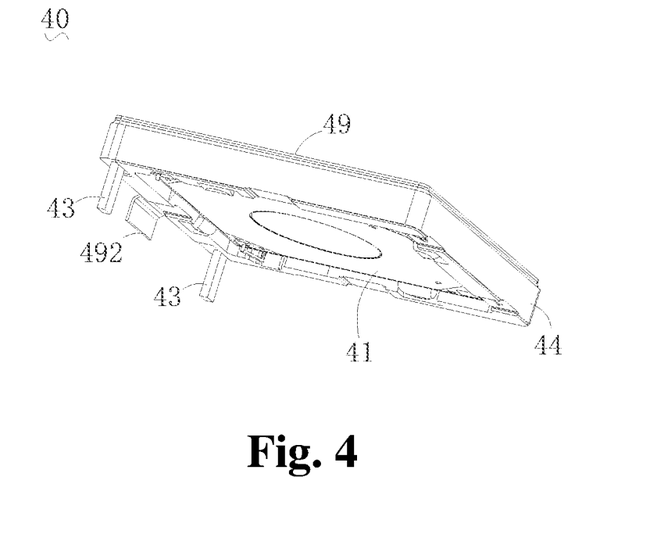
FIG. 4 is a perspective assembled view of an adjustable lens assembly according to an embodiment of the present disclosure.
Figure 5:
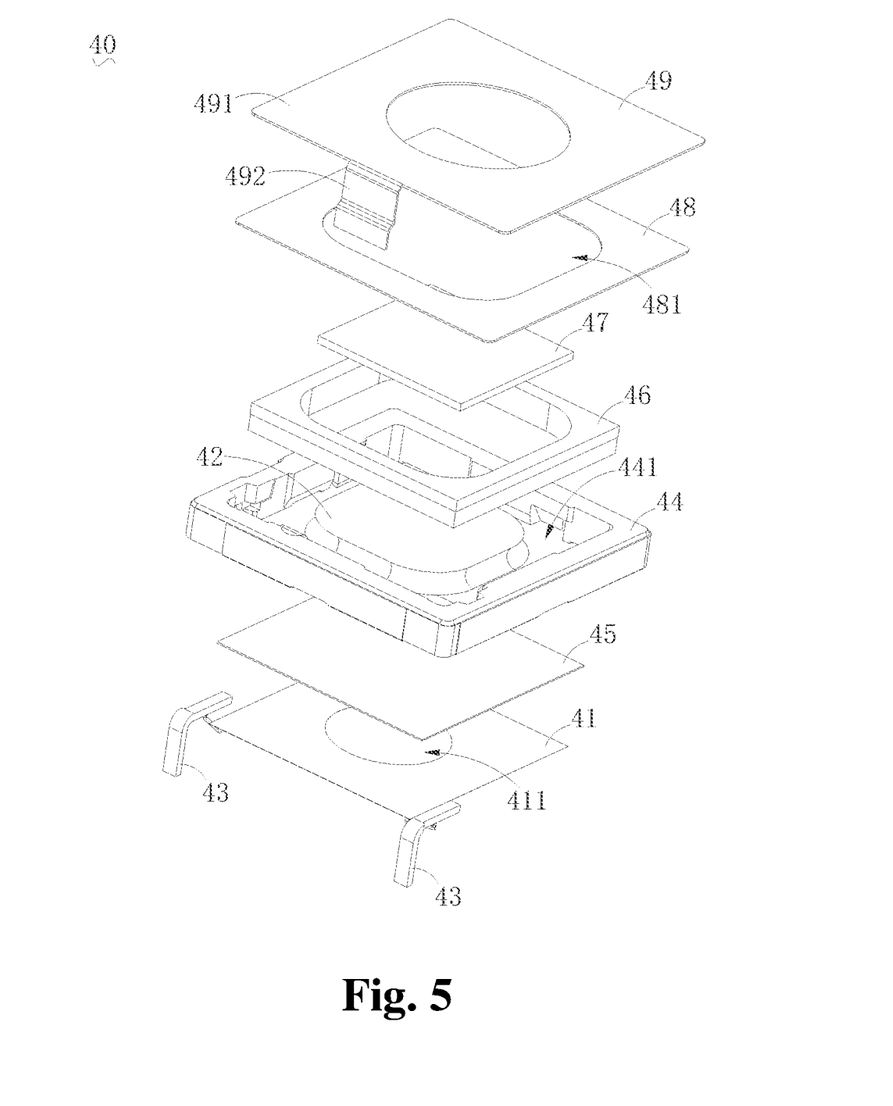
FIG. 5 is a perspective exploded view of an adjustable lens assembly according to an embodiment of the present disclosure.
Figure 6:
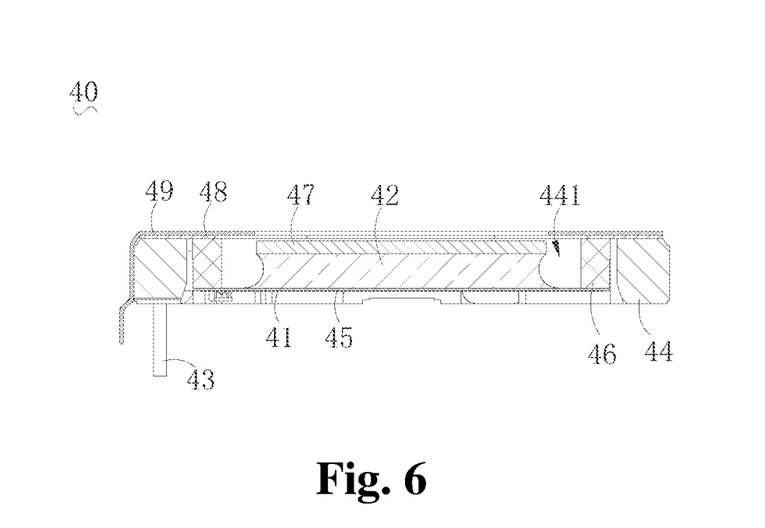
FIG. 6 is a sectional view of the adjustable lens assembly illustrated in FIG. 3 taken along line VI-VI.

An imaging module 100 according to embodiments of the present disclosure includes a substrate 10, a sensor assembly 20, a lens assembly 30, and an adjustable lens assembly 40. The sensor assembly 20 is arranged on the substrate 10 and is configured to receive light passing through the adjustable lens assembly 40 and the lens assembly 30. The adjustable lens assembly 40 includes a piezoelectric actuator 41 and an adjustable lens 42 (as illustrated in FIGS. 4-6). The piezoelectric actuator 41 is configured to drive the adjustable lens 42 to deform under the action of an electrical signal, so as to change a focal length of the imaging module 100.

In some embodiments, the adjustable lens assembly 40 is arranged on a top face 311 of a lens barrel 31 of the lens assembly 30, and the lens assembly 30 is arranged between the substrate 10 and the adjustable lens assembly 40.

In some embodiments, the lens assembly 30 includes a lens barrel 31 and a lens 32 received in the lens barrel 31, and the adjustable lens assembly 40 further includes at least two contact terminals 43. The contact terminals 43 are connected to the piezoelectric actuator 41. A plurality of conductive members 50 are arranged to the lens barrel 31, and both ends of at least two of the plurality of conductive members 50 are electrically connected to the contact terminal 43 and the substrate 10, respectively, to transmit electrical signals.

In some embodiments, the conductive members 50 are arranged on an outer surface of the lens barrel 31.

In some embodiments, the outer surface of the lens barrel 31 is provided with a wire groove 313 at a position corresponding to the conductive member 50, and the conductive member 50 is arranged in the wire groove 313.

In some embodiments, the lens barrel 31 has a top face 311, the adjustable lens assembly 40 is coupled to the top face 311, the top face 311 is provided with a relief groove 314, and the contact terminal 43 extends into the relief groove 314 and is electrically connected to the conductive member 50.

In some embodiments, the sensor assembly 20 includes a sensor 21 and a package body 22. The sensor 21 is configured to receive light. The package body 22 is configured to package the sensor 21. The lens barrel 31 includes a body 315 and a connecting protrusion 316. The connecting protrusion 316 extends from the body 315. The connecting protrusion 316 is provided with the conductive member 50. The package body 22 is provided with a connecting groove 221. A contact 11 is arranged on the substrate 10 at a position corresponding to the connecting groove 221. The connecting protrusion 316 extends into the connecting groove 221 such that the conductive member 50 on the connecting protrusion 316 is electrically connected with the contact 11.

In some embodiments, the adjustable lens assembly 40 further includes a frame 44. The frame 44 is arranged on the lens barrel 31, and the piezoelectric actuator 41 and the adjustable lens 42 are received in the frame 44. The contact terminal 43 is fixed to the frame 44.

In some embodiments, the adjustable lens assembly 40 further includes a conductive shielding member 49. The shielding member 49 is arranged on an end of the frame 44 facing away from the lens barrel 31. Both ends of at least one of the plurality of conductive member 50 are electrically connected to the shielding member 49 and the substrate 10, respectively, so as to ground the shielding member 49.

In some embodiments, the adjustable lens assembly 40 further includes a membrane 45 arranged between the piezoelectric actuator 41 and the adjustable lens 42, and the membrane 45 is attached to the piezoelectric actuator 41 and the adjustable lens 42. When the piezoelectric actuator 41 deforms, the piezoelectric actuator 41 transmits an acting force to the membrane 45, and the membrane 45 deforms and causes the adjustable lens 42 to deform.

An electronic apparatus according to embodiments of the present disclosure includes a shell and the imaging module according to any embodiment of the present disclosure, and the imaging module is arranged to the shell.

Figure 1:
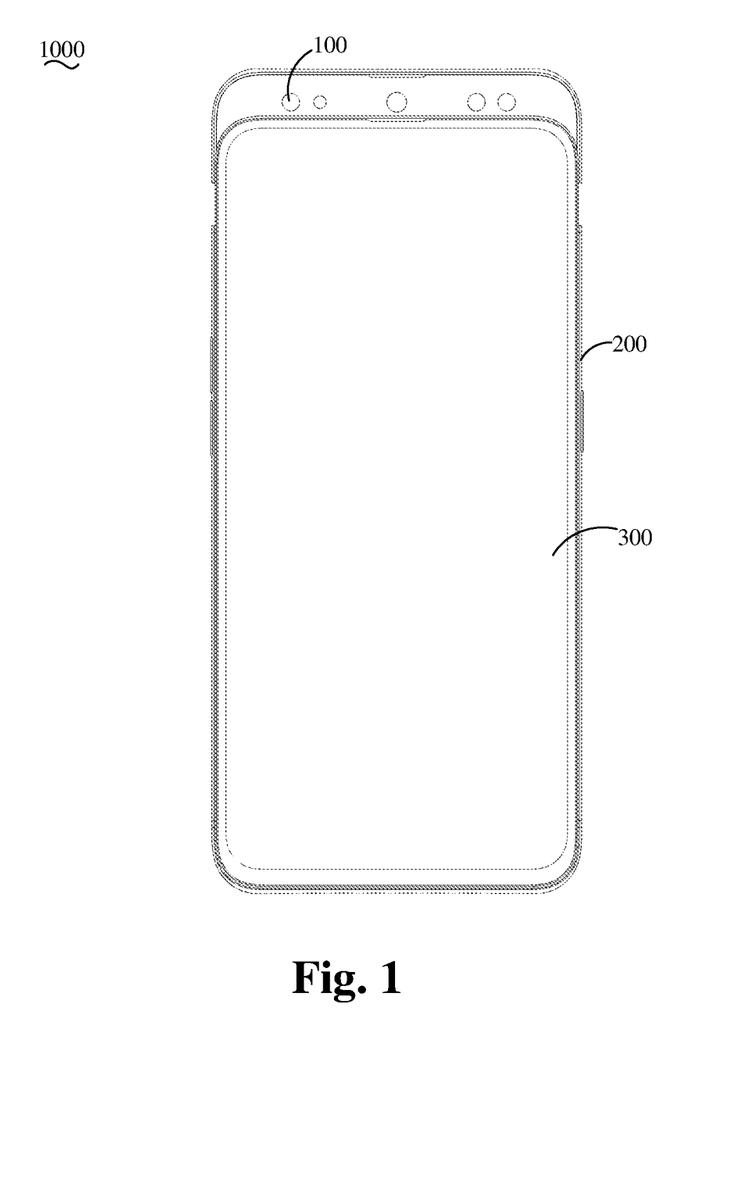
FIG. 1 is a schematic view of an electronic apparatus according to an embodiment of the present disclosure.
Figure 2:
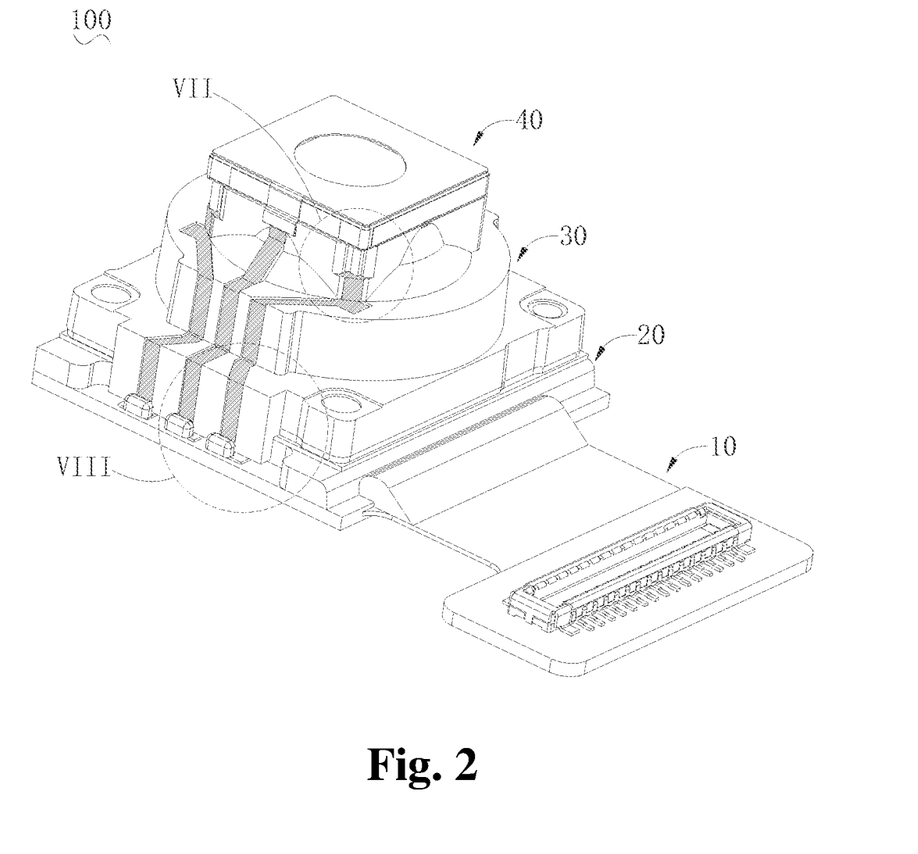
FIG. 2 is a perspective assembled view of an imaging module according to an embodiment of the present disclosure.

As illustrated in FIGS. 1 and 2, an electronic apparatus 1000 according to the embodiments of the present disclosure includes a shell 200 and an imaging module 100. The electronic apparatus 1000 may utilize the imaging module 100 to obtain an image of a target scene, such as a photograph taken or a video recorded for the scene, etc. The electronic apparatus 1000 may be, in particular, a mobile phone, a tablet computer, a surveillance camera, a head-mounted display device, a smart watch, etc. The embodiment of the present disclosure is described with reference to the case where the electronic apparatus 1000 is a mobile phone, and it is to be understood that the particular form of the electronic apparatus 1000 is not limited to the mobile phone, but may be other, and is not limited herein.

The shell 200 may be a housing of the electronic apparatus 1000. The shell 200 can serve as a mounting carrier of the imaging module 100, and the shell 200 can provide waterproof, dustproof and anti-falling protections for the imaging module 100. In an embodiment, the shell 200 may be provided with a through hole, and when the imaging module 100 is arranged to the shell 200, a light incident hole of the imaging module 100 may be aligned with the through hole, and the through hole may be formed in a front or back face of the shell 200. In another embodiment, a display screen 300 is also mounted to the shell 200, and the imaging module 100 may be arranged below the display screen 300, i.e., the light is received by the imaging module 100 after passing through the display screen 300 and used for imaging. In yet another embodiment, when the imaging module 100 is not needed, the imaging module 100 is arranged below the display screen 300, and the display screen 300 shields the imaging module 100; when the imaging module 100 is needed, the display screen 300 and the imaging module 100 are driven to move relative to each other (for example, the display screen 300 and the imaging module 100 are driven to slide or rotate relative to each other), so that the display screen 300 no longer shields the imaging module 100, which facilitates the imaging module 100 to receive an ambient light.

The imaging module 100 is arranged to the shell 200. In some embodiments of the present disclosure, the imaging module 100 may be completely mounted within the shell 200, or the imaging module 100 may also be partly arranged within the shell 200 and partially extends out of the shell 200. The imaging module 100 may be a visible light imaging module (including a color-image imaging module and a black-and-white-image imaging module) based on a visible light imaging or an infrared imaging module based on an infrared light imaging.

Figure 3:
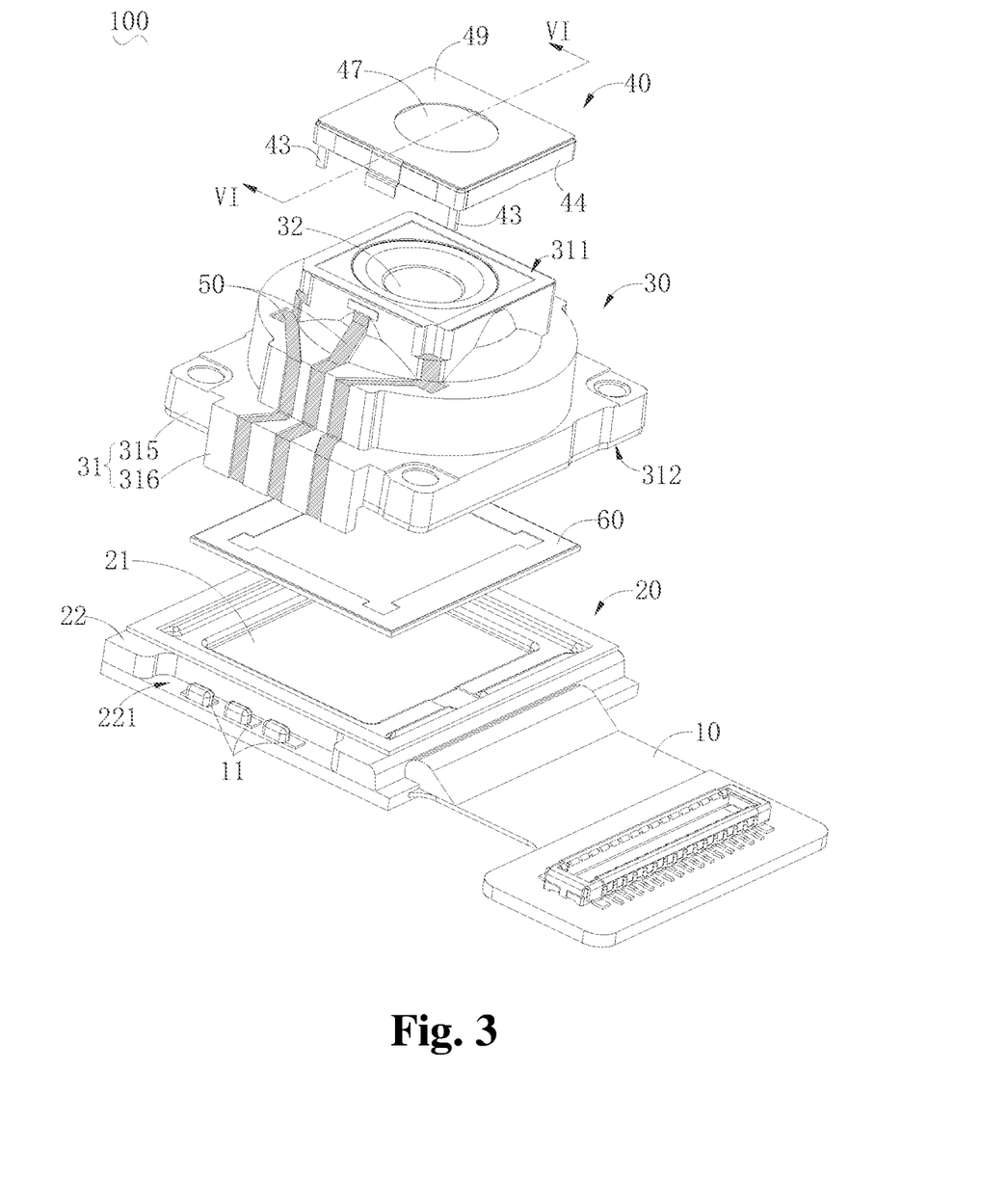
FIG. 3 is a perspective exploded view of an imaging module according to an embodiment of the present disclosure.

In combination with FIGS. 2 and 3, the imaging module 100 includes a substrate 10, a sensor assembly 20, a lens assembly 30, and an adjustable lens assembly 40. The sensor assembly 20 is arranged on the substrate 10 and configured to receive light passing through the adjustable lens assembly 40 and the lens assembly 30. The adjustable lens assembly 40 includes a piezoelectric actuator 41 and an adjustable lens 42 (as illustrated in FIGS. 4-6). The piezoelectric actuator 41 is configured to drive the adjustable lens 42 to deform under the action of an electrical signal, so as to change a focal length of the imaging module 100.

In some embodiments of the present disclosure, the substrate 10 may include a wiring board and electronic components arranged on the wiring board. The wiring board may be a printed wiring board, a flexible wiring board, or a flex-rigid wiring board. The electronic components may be transistors, capacitors, inductors, etc. The substrate 10 may be used to connect the imaging module 100 to a motherboard of the electronic apparatus 1000, for example to electrically connect the sensor assembly 20 and the adjustable lens assembly 40 to the motherboard, so as to enable the imaging module 100 to communicate with the motherboard of the electronic apparatus 1000.

As illustrated in FIG. 3, the sensor assembly 20 is arranged on the substrate 10. The sensor assembly 20 may be configured to convert a received optical signal into an electrical signal, and transmit the electrical signal through the substrate 10 to a processor of the electronic apparatus 1000, for a final imaging. The sensor assembly 20 includes a sensor 21 and a package body 22. The sensor 21 is configured to receive the light, and the sensor 21 may be a CCD or CMOS image sensor. The package body 22 is configured to package the sensor 21. In the embodiment of the present disclosure, the sensor 21 may be fixed to the package body 22, and the package body 22 may be fixed with the substrate 10 by means of an adhesive or the like. Furthermore, the package body 22 may also carry an optical filter 60 thereon, and the optical filter 60 may be configured to filter an interference light entering the imaging module 100, for example. When the imaging module 100 is a visible light imaging module, the optical filter 60 may be configured to filter an infrared light, and in this case, the optical filter 60 may, in particular, be a blue glass to reduce the influence of the infrared light on the imaging quality. When the imaging module 100 is an infrared imaging module 100, the optical filter 60 may be configured to filter a visible light to reduce the influence of the visible light on the imaging quality.

Continuing to refer to FIG. 3, the lens assembly 30 may be arranged on the sensor assembly 20. In particular, the lens assembly 30 includes a lens barrel 31, which may be carried on the package body 22, and a lens 32, which may be received in the lens barrel 31. The entire lens barrel 31 may have a small upper portion and a large lower portion so that the lens barrel 31 may be stable after being mounted. The lens barrel 31 includes a top face 311 and a bottom face 312 facing away from each other, the bottom face 312 may be connected with the package body 22, and the top face 311 may be connected with the adjustable lens assembly 40. A plurality of the lenses 32 may be provided, and the lenses 32 may change a light path of the light entering the imaging module 100 to have a converging or diverging influence on the light. In the embodiment of the present disclosure, the focal length of the lens assembly 30 is not adjustable, i.e., the distance among the plurality of lenses 32 will not need to be adjusted, so that an additional driving apparatus (such as a voice coil motor) may be not needed to drive the lenses 32 to move, and thus the lens assembly 30 is simple in structure and small in size.

As illustrated in FIGS. 2 and 3, the adjustable lens assembly 40 is arranged on the lens assembly 30, and the light sequentially passes through the adjustable lens assembly 40 and the lens assembly 30 to enter the imaging module 100. In some embodiments of the present disclosure, the adjustable lens assembly 40 is arranged on the top face 311 of the lens barrel 31, and the lens assembly 30 is arranged between the substrate 10 and the adjustable lens assembly 40, so that the adjustable lens assembly 40 is easy to disassemble and replace. The adjustable lens assembly 40 includes a piezoelectric actuator 41 and an adjustable lens 42.

The piezoelectric actuator 41 may be electrically connected to the substrate 10, may be made of a material with a piezoelectric effect, such as a piezoelectric ceramic, and may deform under the action of an electrical signal, such as a voltage. The adjustable lens 42 may be made of a transparent flexible polymer, and tends to deform under a squeezing or pulling action of an external force so as to change a curvature of an outer surface of the adjustable lens 42, thereby changing a refraction action of the adjustable lens 42 on the light, i.e. changing a focal length of the imaging module 100.

Since there is no need to drive the entire lens 32 to move to change the focal length, the use of the adjustable lens assembly 40 has the following advantages: (1) the power consumption of the adjustable lens assembly 40 is low when changing the focal length, for example, the power consumption of only 5 milliwatts may be required; (2) the adjustable lens assembly 40 does not have the problem that the difficulty of driving the lens 32 to move is different due to the different arrangement directions of the imaging module 100, that is, changing the focal length is not affected by gravity; (3) the plurality of lenses 32 do not need to move relative to one another, and thus there is not the problem of instability of an optical axis when the relative movement of the plurality of lenses 32 shifts; (4) when the adjustable lens assembly 40 is to be tested and corrected, only one adjustable lens 42 needs to be tested and corrected, and the plurality of lenses 32 do not need to be tested and corrected, which reduces the cost of the test and correction; (5) the adjustable lens 42 does not have hysteresis under the action of the electrical signal.

When the focal length of the imaging module 100 needs to be adjusted, the electrical signal of a corresponding size is applied to the piezoelectric actuator 41 according to a size of the focal length required to be adjusted, so that the piezoelectric actuator 41 generates a corresponding deformation, the deformation of the piezoelectric actuator 41 causes the adjustable lens 42 to be affected by an external force, and thus the adjustable lens 42 generates a corresponding deformation, thereby finally achieving the purpose of adjusting the focal length. It will be appreciated that since a conventional mechanical structure is not required for driving during the entire process of adjusting the focal length, the adjustable lens assembly 40 does not generate a noise during operations, and the time required for adjusting the focal length is short, which can achieve a rapid focusing.

In addition, in the process of realizing zooming by using the adjustable lens assembly 40, the distance between the adjustable lens 42 and the sensor 21 is not changed, and a field of view range of the imaging module 100 is not changed, such that a plurality of images at different objectside focal planes can be shot in a short time in combination with the fast focusing feature of the adjustable lens assembly 40. Synthesizing the plurality of images can obtain an image with all objects in the field of view being clear. Or, a plane or a depth range required to be imaged clearly is selected from the plurality of images, and then a background is blurred to achieve a background blurring by using a single imaging module 100.

In the related art, the volume of the lens module is greatly increased due to the existence of the voice coil motor, and thus the lens module is prevented from being made smaller and thinner. Moreover, the voice coil motor drives the lens to move under the action of a magnetic force so as to complete focusing, and hence peripheral magnetic fields generated by other electronic components can interfere with the normal operation of the voice coil motor. In summary, in the electronic apparatus 1000 according to the embodiment of the present disclosure, the electrical signal can act on the piezoelectric actuator 41 to drive the adjustable lens 42 to deform so as to change the focal length of the imaging module 100, and the additional driving apparatus such as the voice coil motor can be omitted so as to reduce the size of the imaging module 100. Moreover, the peripheral magnetic fields generated by other electronic components will not affect the operation of the adjustable lens assembly, and hence the imaging module has a strong anti-interference capability.

As illustrated in FIGS. 3 and 4, in some embodiments, the adjustable lens assembly 40 further includes at least two contact terminals 43. The contact terminals 43 are connected to the piezoelectric actuator 41. A plurality of conductive members 50 are arranged to the lens barrel 31, and both ends of at least two of the plurality of conductive members 50 are electrically connected to the contact terminal 43 and the substrate 10, respectively, so as to transmit the electrical signal.

In the embodiment of the present disclosure, two contact terminals 43 are provided, and both contact terminals 43 are connected to the piezoelectric actuator 41. Each contact terminal 43 is electrically connected to the substrate 10 through one conductive member 50, and there may be no direct contact between two conductive members 50. The conductive member 50 may be particularly made of a conductive material such as a copper foil.

In an example, the conductive member 50 is arranged on the outer surface of the lens barrel 31 to facilitate the fabrication of the conductive member 50 on the lens barrel 31. For example, the outer surface of the lens barrel 31 is plated with the conductive member 50. Furthermore, the plurality of conductive members 50 may be formed on the same side of an outer wall of the lens barrel 31 to facilitate the arrangement of the contact terminals 43 and the arrangement of wirings on the substrate 10.

Figure 7:
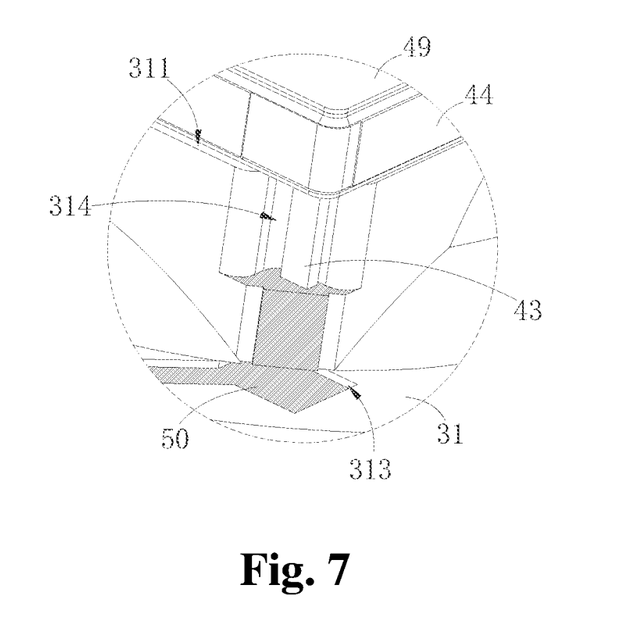
FIG. 7 is an enlarged view of part VII of the imaging module illustrated in FIG. 2.
Figure 8:
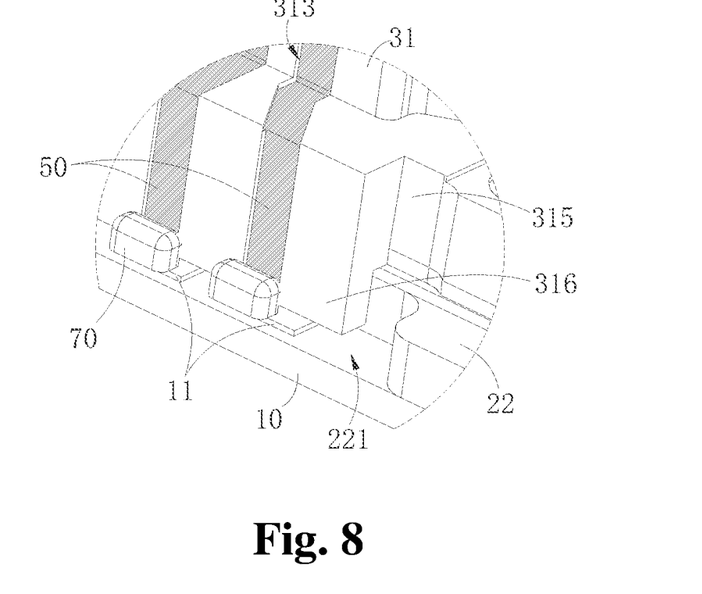
FIG. 8 is an enlarged view of part VIII of the imaging module illustrated in FIG. 2.

As illustrated in FIGS. 3, 7 and 8, in some embodiments, the outer surface of the lens barrel 31 is provided with a wire groove 313 at a position corresponding to the conductive member 50, and the conductive member 50 is arranged in the wire groove 313. Since the conductive member 50 is arranged in the wire groove 313, the conductive member 50 tends not to be scratched by external foreign matters so as not to affect the conductive performance thereof, and the conductive member 50 can be fixed in the wire groove 313 easily and tends not to come out thereof.

As illustrated in FIGS. 2 and 7, in some embodiments, the top face 311 is provided with a relief groove 314, and the contact terminal 43 extends into the relief groove 134 and is electrically connected to the conductive member 50. In some embodiments of the present disclosure, the conductive member 50 may also be arranged at the bottom of the relief groove 314, and the contact terminal 43 extends into the relief groove 314 to be in contact the conductive member 50. By providing the relief groove 314 in the lens barrel 31, a space is actually provided for accommodating part of the contact terminal 43, and thus the overall size of the imaging module 100 is reduced.

As illustrated in FIGS. 2, 3, and 8, in some embodiments, the lens barrel 31 includes a body 315 and a connecting protrusion 316. The connecting protrusion 316 extends from the body 315. The connecting protrusion 316 is also provided with the conductive member 50. The package body 22 is provided with a connecting groove 221. A contact 11 is arranged on the substrate 10 at a position corresponding to the connecting groove 221. The connecting protrusion 316 extends into the connecting groove 221 to electrically connect the conductive member 50 on the connecting protrusion 316 with the contact 11.

In some embodiments of the present disclosure, the connecting protrusion 316 extends from the bottom face 312 in a direction running away from the top face 311, and the conductive member 50 is arranged on the connecting protrusion 316. The connecting groove 221 is formed in the package body 22, and may extend through the package body 22. The sensor assembly 20 is mounted to the substrate 10 while the connecting groove 221 is in alignment with the contact 11, and the lens assembly 30 is mounted to the sensor assembly 20 while the connecting protrusion 316 is in alignment with the connecting groove 221, so as to quickly align a mounting direction and prevent a reverse mounting. After the connecting protrusion 316 extends into the connecting groove 221, the conductive member 50 is adjacent to or in contact with the contact 11, and the conductive member 50 can be further soldered with the contact 11 by a soldering tin 70, so as to increase the reliability of the electric connection.

As illustrated in FIGS. 4-6, in some embodiments, the adjustable lens assembly 40 further includes a frame 44. The frame 44 is arranged on the lens barrel 31, and the piezoelectric actuator 41 and the adjustable lens 42 are received in the frame 44. The contact terminals 43 are fixed to the frame 44.

The whole frame 44 may have a hollow annular shape, a hollow portion of the frame 44 defines an accommodating space 441, and the piezoelectric actuator 41 and the adjustable lens 42 may be received in the accommodating space 441. The contact terminals 43 are fixed to the frame 44, and in particular, the contact terminals 43 and the frame 44 may be manufactured together by in-mold injection molding.

Continuing to refer to FIGS. 4-6, in the embodiment of the present disclosure, the adjustable lens assembly 40 may further includes a membrane 45, a lining 46, a supporting member 47, and a fixing member 48.

The membrane 45 may be a transparent glass membrane 45, which may be arranged between the piezoelectric actuator 41 and the adjustable lens 42. In some embodiments of the present disclosure, the membrane 45 may be attached to the piezoelectric actuator 41 and the adjustable lens 42. The whole piezoelectric actuator 41 may have an annular shape, and a hollow portion of the piezoelectric actuator 41 is aligned with the adjustable lens 42, such that when the piezoelectric actuator 41 deforms, the piezoelectric actuator 41 may transmit an acting force to the membrane 45, and the membrane 45 deforms and drives the adjustable lens 42 to deform. The amount of deformation of the adjustable lens 42 is proportional to the magnitude of the electrical signal acting on the piezoelectric actuator 41.

The whole lining 46 may have an annular shape and surround the adjustable lens 42. The lining 46 is received in the accommodating space 441, and arranged between the adjustable lens 42 and the frame 44. The adjustable lens 42 is spaced from a side wall of the lining 46 so as to provide axial and radial deformation space for the adjustable lens 42. Two end faces of the lining 46 may abut against and be coupled with the membrane 45 and the fixing member 48, respectively. The material of the lining 46 may be silicon.

The supporting member 47 is attached to the adjustable lens 42. In some embodiments of the present disclosure, the supporting member 47 is attached to a side of the adjustable lens 42 facing away from the membrane 45. The supporting member 47 may be made of transparent glass. When the adjustable lens 42 deforms, the side of the adjustable lens 42 attached to the supporting member 47 may not deform due to the restriction of the supporting member 47. That is, the curvature of the side of the adjustable lens 42 attached to the supporting member 47 may not be changed so that the amount of deformation is concentrated on the side of the adjustable lens 42 attached to the membrane 45.

The fixing member 48 is fixed to the frame 44. In some embodiments of the present disclosure, the fixing member 48 is fixed to a side of the frame 44 facing away from the lens barrel 31. The fixing member 48 may be configured to fix the lining 46 in the accommodating space 441 so as to prevent elements such as the lining 46, the adjustable lens 42, etc. from coming out of the accommodating space 441.

When the light entering the imaging module 100 passes through the adjustable lens assembly 40, the light may sequentially pass through a first light-passing hole 481 in the fixing member 48, the supporting member 47, the adjustable lens 42, the membrane 45, and a second light-passing hole 411 in the piezoelectric actuator 41.

As illustrated in FIGS. 3, 5, and 6, in some embodiments, the adjustable lens assembly 40 further includes a conductive shielding member 49. The shielding member 49 is arranged at an end of the frame 44 facing away from the lens barrel 31. Both ends of at least one of the plurality of conductive member 50 are electrically connected to the shielding member 49 and the substrate 10, respectively, so as to ground the shielding member 49.

In some embodiments of the present disclosure, the shielding member 49, which may be made of a conductive material such as a copper foil, is arranged on the fixing member 48 and may be located at a topmost portion of the imaging module 100. The shielding member 49 is connected to the substrate 10 by the conductive member 50, and is further grounded, for example, being connected to the shell 200 of the electronic apparatus 1000. In some embodiments of the present disclosure, the shielding member 49 includes a shielding body 491, and a shielding terminal 492 extending from an edge of the shielding body 491. The shielding body 491 is arranged at the end of the frame 44 facing away from the lens barrel 31, and the shielding terminal 492 extends in a direction of the lens assembly 30 and is electrically connected to an end of the conductive member 50. The shielding member 49 may provide an Electro-Static discharge (ESD) protection for the adjustable lens assembly 40 to prevent an external static from affecting elements such as the piezoelectric actuator 41 or the like, so as not to affect the accuracy of image focusing.

In the description of the specification, descriptions with reference to the terms "certain embodiments", "one embodiment", "some embodiments", "exemplary embodiments", "examples", "particular examples", or "some examples" mean that particular features, structures, materials, or characteristics described in combination with the embodiment or example are included in at least one embodiment or example of the present disclosure. In the specification, schematic expressions of the above terms do not necessarily refer to the same embodiment or example. Moreover, the particular features, structures, materials, or characteristics described may be combined in any suitable manner in any one or more embodiments or examples.

Furthermore, the terms "first" and "second" are only used for purpose of descriptions and are not to be construed as indicating or implying relative importance or implicitly indicating the number of technical features indicated. Thus, a feature defined by "first" or "second" may explicitly or implicitly include at least one said feature. In the description of the present disclosure, "a plurality of" means at least two, e.g., two, three, unless particularly defined otherwise.

While the embodiments of the present disclosure have been illustrated and described above, it is to be understood that the above embodiments are exemplary and are not to be construed as limiting the present disclosure, and that changes, modifications, substitutions and variations of the above embodiments may occur to those of ordinary skill in the art within the scope of the present disclosure, and the scope of the present disclosure is defined by the claims and their equivalents.

What is claimed is:

1. An imaging module, comprising a substrate, a sensor assembly, a lens assembly and an adjustable lens assembly, the sensor assembly being arranged on the substrate and being configured to receive light passing through the adjustable lens assembly and the lens assembly, the adjustable lens assembly comprising a piezoelectric actuator and an adjustable lens, and the piezoelectric actuator being configured to deform the adjustable lens through the action of an electrical signal and change a focal length of the imaging module
wherein the adjustable lens assembly is arranged on the lens assembly, and the lens assembly is arranged between the substrate and the adjustable lens assembly,
wherein the lens assembly comprises a lens barrel and a lens arranged in the lens barrel, the adjustable lens assembly comprises at least two contact terminals, the contact terminal is connected to the piezoelectric actuator, a plurality of conductive members are arranged to the lens barrel, and both ends of at least two of the plurality of conductive members are electrically connected to the contact terminal and the substrate, respectively, to transmit the electrical signal.

2. The imaging module as claimed in claim 1, wherein the conductive member is arranged to an outer surface of the lens barrel.

3. The imaging module as claimed in claim 2, wherein the outer surface of the lens barrel is provided with a wire groove at a position corresponding to the conductive member, and the conductive member is arranged in the wire groove.

4. The imaging module as claimed in claim 1, wherein the lens barrel has a top face, the adjustable lens assembly is coupled to the top face, the top face is provided with a relief groove, and the contact terminal extends into the relief groove and is electrically connected to the conductive member.

5. The imaging module as claimed in claim 1, wherein the sensor assembly comprises a sensor and a package body, the sensor is configured to receive the light, the package body is configured to package the sensor, the lens barrel comprises a body and a connecting protrusion extending from the body, the connecting protrusion is provided with the conductive member, the package body is provided with a connecting groove, a contact is arranged on the substrate at a position corresponding to the connecting groove, and the connecting protrusion extends into the connecting groove to electrically connect the conductive member on the connecting protrusion with the contact.

6. The imaging module as claimed in claim 1, wherein the adjustable lens assembly further comprises a frame arranged on the lens barrel, the piezoelectric actuator and the adjustable lens are arranged in the frame, and the contact terminal is fixed to the frame.

7. The imaging module as claimed in claim 6, wherein the adjustable lens assembly further comprises a conductive shielding member arranged at an end of the frame facing away from the lens barrel, both ends of at least one of the plurality of conductive members are electrically connected to the shielding member and the substrate, respectively, to ground the shielding member.

8. The imaging module as claimed in claim 1, wherein the adjustable lens assembly further comprises a membrane arranged between the piezoelectric actuator and the adjustable lens, the membrane is attached to the piezoelectric actuator and the adjustable lens, the piezoelectric actuator is configured to transmit an acting force to the membrane, and the membrane is configured to deform and drive the adjustable lens to deform, when the piezoelectric actuator deforms.

9. An electronic apparatus, comprising:
a shell; and
an imaging module arranged to the shell, and comprising a substrate, a sensor assembly, a lens assembly and an adjustable lens assembly, the sensor assembly being arranged on the substrate and being configured to receive light passing through the adjustable lens assembly and the lens assembly, the adjustable lens assembly comprising a piezoelectric actuator and an adjustable lens, and the piezoelectric actuator being configured to deform the adjustable lens through the action of an electrical signal and change a focal length of the imaging module
wherein the adjustable lens assembly is arranged on the lens assembly, and the lens assembly is arranged between the substrate and the adjustable lens assembly,
wherein the lens assembly comprises a lens barrel and a lens arranged in the lens barrel, the adjustable lens assembly comprises at least two contact terminals, the contact terminal is connected to the piezoelectric actuator, a plurality of conductive members are arranged to the lens barrel, and both ends of at least two of the plurality of conductive members are electrically connected to the contact terminal and the substrate, respectively, to transmit the electrical signal.

10. The electronic apparatus as claimed in claim 9, wherein an outer surface of the lens barrel is provided with a wire groove at a position corresponding to the conductive member, and the conductive member is arranged in the wire groove.

11. The electronic apparatus as claimed in claim 9, wherein the lens barrel has a top face, the adjustable lens assembly is coupled to the top face, the top face is provided with a relief groove, and the contact terminal extends into the relief groove and is electrically connected to the conductive member.

12. The electronic apparatus as claimed in claim 9, wherein the sensor assembly comprises a sensor and a package body, the sensor is configured to receive the light, the package body is configured to package the sensor, the lens barrel comprises a body and a connecting protrusion extending from the body, the connecting protrusion is provided with the conductive member, the package body is provided with a connecting groove, a contact is arranged on the substrate at a position corresponding to the connecting groove, and the connecting protrusion extends into the connecting groove to electrically connect the conductive member on the connecting protrusion with the contact.

13. The electronic apparatus as claimed in claim 9, wherein the adjustable lens assembly further comprises a frame arranged on the lens barrel, the piezoelectric actuator and the adjustable lens are arranged in the frame, and the contact terminal is fixed to the frame.

14. The electronic apparatus as claimed in claim 13, wherein the adjustable lens assembly further comprises a conductive shielding member arranged at an end of the frame facing away from the lens barrel, both ends of at least one of the plurality of conductive member are electrically connected to the shielding member and the substrate, respectively, to ground the shielding member.

15. The electronic apparatus as claimed in claim 9, wherein the adjustable lens assembly further comprises a membrane arranged between the piezoelectric actuator and the adjustable lens, the membrane is attached to the piezoelectric actuator and the adjustable lens, the piezoelectric actuator is configured to transmit an acting force to the membrane, and the membrane is configured to deform and drive the adjustable lens to deform, when the piezoelectric actuator deforms.

16. An imaging module, comprising:
a substrate;
a sensor assembly arranged on the substrate;
an adjustable lens assembly configured to be passed through by light; and
a lens assembly arranged between the sensor assembly and the adjustable lens assembly, and configured to be passed through by the light passing through the adjustable lens assembly, the sensor assembly being configured to receive the light passing through the lens assembly,
wherein the adjustable lens assembly comprises a piezoelectric actuator and an adjustable lens, and the piezoelectric actuator is configured to deform the adjustable lens and change a focal length of the imaging module,
wherein the adjustable lens assembly is arranged on the lens assembly, and the lens assembly is arranged between the substrate and the adjustable lens assembly,
wherein the lens assembly comprises a lens barrel and a lens arranged in the lens barrel, the adjustable lens assembly comprises at least two contact terminals, the contact terminal is connected to the piezoelectric actuator, a plurality of conductive members are arranged to the lens barrel, and both ends of at least two of the plurality of conductive members are electrically connected to the contact terminal and the substrate, respectively, to transmit the electrical signal.

\* \* \* \* \*